(No Model.)
W. R. SHERMAN.
Vehicle Wheel.
No. 236,187. Patented Jan. 4, 1881.
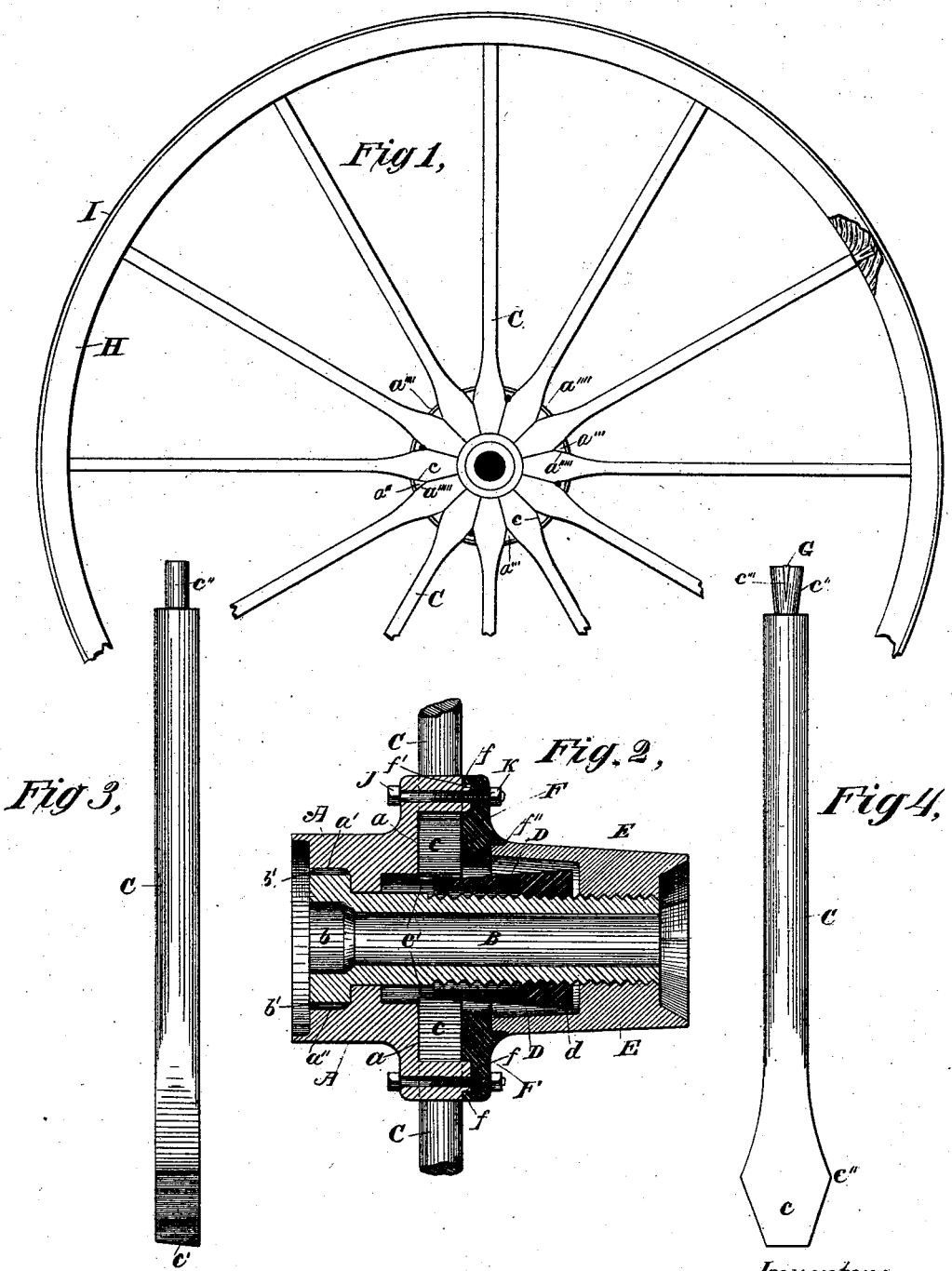

UNITED STATES PATENT OFFICE.

WILLIAM R. SHERMAN, OF ATHENS, TENNESSEE, ASSIGNOR OF ONE-HALF TO ERNEST L. GRUBB, OF SAME PLACE.

VEHICLE-WHEEL.

SPECIFICATION forming part of Letters Patent No. 236,187, dated January 4, 1881.

Application filed October 1, 1880. (No model.)

*To all whom it may concern:*

Be it known that I, WILLIAM R. SHERMAN, of Athens, in the county of McMinn and State of Tennessee, have invented a certain new and useful Improvement in Vehicle-Wheels, of which the following is a full, clear, and exact description, reference being had to the accompanying drawings, forming part of this specification.

My invention relates to those vehicle-wheels which are provided with box-hubs having means for tightening the tire by forcing the spokes outward.

My improvement consists in a hub of malleable iron, or other suitable material, constructed with mortises adapted to receive dovetailed spokes fitting therein, so that when the spokes are pressed outward they shall not only tighten the tire, but at the same time be tightened themselves in the hub by having their dovetailed portions pressed into the tapering mortises, as hereinafter described.

In order that the invention may be fully understood I will proceed to describe it with reference to the accompanying drawings, in which—

Figure 1 is a side view of my improved wheel, the box-cap, front plate, and thimble being removed and the felly partly in section. Fig. 2 is a longitudinal section of the hub-portion on a larger scale. Figs. 3 and 4 are front and side views, respectively, of one of the spokes detached.

A represents a hub, constructed, preferably, of malleable iron, and having mortises $a$ formed therein for the reception of the spokes C, which are dovetailed at $c$ so as to fit the mortises closely.

B is the box, which has a head, $b$, constructed with lugs $b'$, adapted to fit in the hub, which is recessed correspondingly at $a'$ $a''$. The box is screw-threaded nearly its whole length, to receive a thimble or tapering ring, D, constructed with an angular head, $d$, for receiving a wrench, and adapted to force the spokes outward by pressing on their very slightly inclined ends $c'$. The box also receives the cap-piece E for securing the box in the hub.

After the spokes are in place triangular projections $a'''$ extend between them. The outer edges of these projections are cut away at $a''''$, so as to receive the flange $f$ of the collar or plate F, grooved at $f'$, and formed with a seat, $f''$, for the cap-piece E, the groove $f'$ receiving the projections $a'''$ of the hub. The collar or plate F is secured to the hub A by suitable bolts J and nuts K.

The outer ends of the spokes are constructed with tenons $c''$, with their ends split, at $c'''$, to receive wedges G, which expand the tenons as they are forced into their respective receptacles in the felly H.

The tire of the wheel is shown at I.

The spokes C are shouldered at $c''''$, so as to press against the inclined sides $a'''''$ of the mortises when the spokes are forced outward, as above described.

Any one or more of the spokes may be removed, and new ones substituted therefor, without disturbing the remainder, as it is only necessary to remove the cap E, collar F, and thimble D.

The advantage of this improvement will be apparent. The whole wheel is tightened at one operation, for as soon as the thimble is turned forward the tire and the spokes in the hub are tightened simultaneously.

I claim as my invention—

The combination of spokes C, having dovetailed portions $c$ and shoulders $c''''$, the hub A, having mortises $a$, providing inclined sides $a'''''$, and a thimble, D, adapted to press the said dovetailed portions onto the said inclined sides, as set forth.

In testimony of which invention I hereunto set my hand this 28th day of September, 1880.

WILLIAM R. SHERMAN.

Witnesses:
JNO. H. GRUBB,
WILLIAM LOWE.